UNITED STATES PATENT OFFICE.

BOTHO SCHWERIN, OF FRANKFORT-ON-THE-MAIN, GERMANY, ASSIGNOR TO ELEKTRO-OSMOSE A. G. (GRAF SCHWERIN-GESELLSCHAFT), OF FRANKFORT-ON-THE-MAIN, GERMANY, A CORPORATION.

MANUFACTURE OF STABLE COLLOIDAL SOLUTIONS OF METALS.

1,119,647.  Specification of Letters Patent.  Patented Dec. 1, 1914.

No Drawing.  Application filed April 18, 1914.  Serial No. 832,940.

*To all whom it may concern:*

Be it known that I, BOTHO SCHWERIN, a subject of the German Emporer, and residing at Frankfort-on-the-Main, Germany, have invented certain new and useful Improvements in the Manufacture of Stable Colloidal Solutions of Metals, of which the following is a specification.

It is known that metal sols can be rendered stable by so-called organic protective colloids. Such colloids are gelatin, solutions of albumin or other substances of high molecular weight.

According to the present invention metal sols can be advantageously rendered stable by using soluble silicic acid. Should the method of producing the metal sol involve the presence of an electrolyte in the solution the preparation is preferably purified electro-osmotically.

The application of water glass in the preparation of metal sols is known. The present invention, however, resides in the use of soluble silicic acid which is both chemically and physically considerably different from water glass. It has been shown that in the presence of even only small proportions of an electrolyte the preparation is not stable. Soluble silicic acid presents a material completely free from electrolyte and renders possible the attainment of a high degree of stability in the metal sol.

It is particularly advantageous to use hydrazin hydrate for the reduction of the metal salt because the silicic acid sol is insensitive toward hydrazin hydrate while it is unfavorably affected by other reducing agents, such as formaldehyde, which have a tendency to change it into the gel form.

The process may be carried out for example as follows:—A solution of silicic acid containing about 2.5 per cent. of the acid is mixed with a diluted solution of a gold or silver salt and the metal is reduced by a reducing agent suitable for separating it in the colloidal form. If for instance hydrazin hydrate is the reducing agent a completely clear brown silver sol, or deep blue gold sol is obtained.

What I claim is:

1. The manufacture of stable colloidal solutions of metals wherein the solution is rendered stable by means of soluble silicic acid.

2. The manufacture of stable colloidal solutions of metals consisting in mixing silicic acid with a solution of a metal salt and reducing the metal in the presence of the silicic acid.

3. The manufacture of stable colloidal solutions of metals consisting in mixing silicic acid with a solution of the metal salt and reducing the metal with hydrazin hydrate.

In testimony whereof I affix my signature in presence of two witnesses.

BOTHO SCHWERIN.

Witnesses:
  JEAN GRUND,
  CARL GRUND.